March 7, 1961 T. J. CRAWFORD 2,974,217
METHOD AND APPARATUS FOR ELECTRIC WELDING
PIPE AND THE LIKE
Filed Jan. 7, 1959 3 Sheets-Sheet 1

INVENTOR.
THOMAS J. CRAWFORD
BY
Oberlin, Maky, & Donnelly
ATTORNEYS

March 7, 1961

T. J. CRAWFORD 2,974,217

METHOD AND APPARATUS FOR ELECTRIC WELDING
PIPE AND THE LIKE

Filed Jan. 7, 1959

INVENTOR.
THOMAS J. CRAWFORD
BY
Oberlin, Maky, & Donnelly
ATTORNEYS

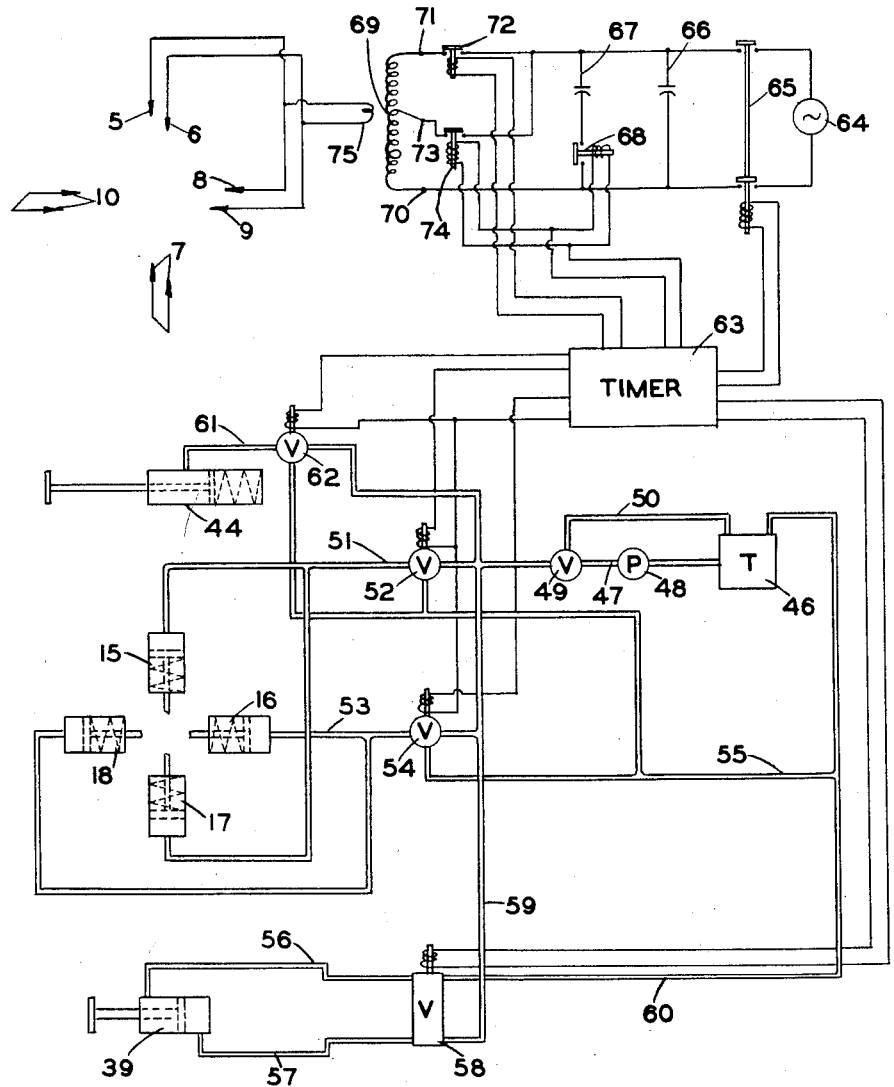

United States Patent Office 2,974,217
Patented Mar. 7, 1961

2,974,217

METHOD AND APPARATUS FOR ELECTRIC WELDING PIPE AND THE LIKE

Thomas J. Crawford, Berkley, Mich.
(P.O. Box 171, Gaylord, Mich.)

Filed Jan. 7, 1959, Ser. No. 785,500

10 Claims. (Cl. 219—101)

The present improvements, relating as indicated to the electric welding art, are more particularly concerned with method and means for welding together the ends of hollow articles, such as lengths of pipe.

It is a primary object of the invention to provide a method of forming such welded joints which is distinguished by its adaptability to practice with relatively simple, yet automatic, equipment, and an important related object is of course to provide preferred apparatus of this nature for carrying out the process.

Other objectives are rapid operation, high efficiency and economy in the performance of the work required, and while such considerations are obviously desirable regardless of the job to be done, there is almost always room for significant improvement of existing methods and apparatus in such respects. This is believed to be definitely the case in the end-welding of pipe, with the present practices employed in the construction of cross-country steel pipe lines serving to show very clearly the limitations and practical difficulties encountered in the employment of conventional welding techniques for this purpose.

The construction of such a line is progressive in nature and a point is reached at which there are several long lengths of steel pipe distributed along the right of way ready to be permanently joined by welding the end joints thereof. The ends of the pipe lengths are outwardly beveled and, at the present time, they are arc welded by manual operation. More specifically, the operator will make a first pass using a small rod to form a bottom root bead, that is, at the bottom of the notch defined by the beveled edges of the pipe, and this operation is slow and exacting. It is then necessary to finish the weld by filling in the V-stringer bead, with multiple passes needed, and it will be appreciated that each pass requires movement about the complete periphery of the pipe which is, for practical purposes, continuous and generally of rather large diameter. Such field welding is, then, obviously laborious and slow, rough terrain often further complicating the operation, and the result is that the welding step generally constitutes a definite bottleneck in the over-all schedule of construction.

The same type of operation might of course be carried out more conveniently in a shop or plant, but without eliminating the inherent disadvantages of such manual procedure which are thus emphasized in the field. As is apparent from the statement of the primary objects of my invention, the latter provides an improved electric welding technique which can and does eliminate the need for manual welding skill thereby to enhance the operation whether performed in a plant or in the field. The characteristic simplicity of the invention, moreover, permits equipment portability, which is especially advantageous in field welding but also a generally desirable attribute.

Briefly, my new method comprises heating the opposed edge surfaces of the pipe ends to be welded by a particular pattern of electric current flow therein and, when proper temperature has been reached, forcing the heated ends together to weld the same. The current flow is concentrated at the edge surfaces and caused to traverse the complete circumference of each pipe end, this last being a very important characteristic since "cold" spots would result in weld imperfections. The apparatus to be fully described hereinafter represents a preferred embodiment of automatic equipment for the practice of this method.

Further objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said drawings:

Fig. 5 is a schematic diagram showing both a fluid motive system and electrical control circuits for such automatic welding apparatus.

Figure 1:
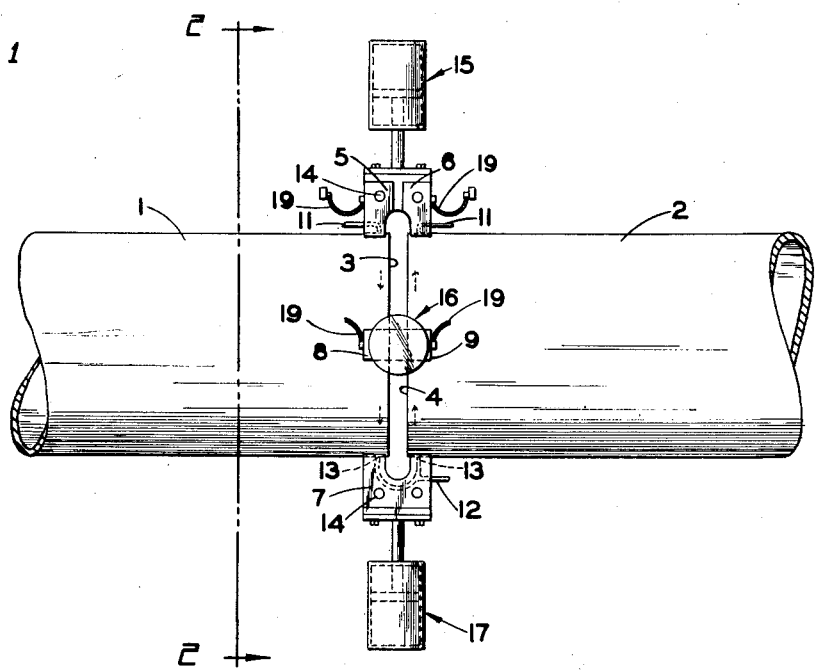
Fig. 1 shows in elevation two pipe ends to be welded in accordance with my new method, with a simple form of apparatus included to facilitate description of such method.

Referring now to the drawings in detail, the two pipe lengths 1 and 2 to be welded are positioned, as shown, in slightly separated alignment with the end faces 3 and 4, respectively, in parallel planes. At a first peripheral location, a supply electrode 5 is brought into contact with the outer surface of the pipe 1, closely adjacent the end thereof, and a similar electrode 6 separate and insulated from the electrode 5, is made to contact the pipe 2 in like manner, the two such electrodes being correspondingly located and thus opposite one another. A bridge or shorting electrode 7 commonly engages, and thus conductively connects, the two pipe ends at points thereon diametrically opposite the pair of electrodes 5 and 6, this shorting electrode likewise engaging the pipes closely adjacent their end faces.

Alternating current voltage derived from a suitable source of electric energy is applied across the supply electrodes 5 and 6, and it will be seen that the pipe ends, as coupled by the shorting electrode, form work circuits for current flow between such supply electrodes. More exactly, the half-sections of pipe between each supply electrode and the shorting electrode provide parallel paths for current flow, and the shorting electrode constitutes a series connection of the two sets of parallel paths in the respective pipe end portions. Accordingly, at a given instant, current will flow for example from the electrode 5 in both directions around the end portion of pipe 1 to the shorting electrode 7, through the latter, and then in both directions from the shorting electrode around the end of pipe 2 to the other supply electrode 6. The alternation of the current of course produces a simple reversal of such direction.

The instantaneous currents in the slightly separated, opposed end faces 3 and 4 of the two pipes flow in opposite directions respectively therein, as indicated by the arrows, so that there is a proximity effect causing such currents to concentrate at these end faces. This effect is more pronounced at higher frequencies and it is preferred to use a source frequency high enough to provide definite skin effect as well. The currents, therefore, tend to become highly concentrated in thin bands at the extreme ends of the pipes, but these bands are not continuous about the end faces.

Such discontinuity is caused by the electrode engagement with the pipe ends, each pipe-electrode contact unavoidably widening the current distribution at the particular local region. Accordingly, there is inherent in the procedure thus far described a variation in current density at the extreme ends of the pipe lengths which results in non-uniform heating of the latter. The electrodes thus may be considered as having a "cooling" effect, important not only as it may reduce the efficiency of the heating, but also as a potential source of weld imperfections. It will be understood that the pipe ends are to be upset when they attain proper welding temperature and "cold" spots about the same would preclude a sound weld being formed.

To eliminate such temperature variation in the region of the electrodes, the points of contact of the same with the ends of the pipe lengths are effectively shifted circumferentially in the heating cycle, with sufficient overlap in the successively defined paths of concentrated flow to include therein portions of the pipe ends which constituted previous regions of electrode contact. This could conceivably be done by employing only a single set of supply electrodes and shorting electrode, but it is preferable to minimize the time lag by employing at least one more set or group of such electrodes positioned in predetermined angular displacement relative to the first set to alternate therewith in the supply of the current. Thus, in Figs. 1 and 2, there is shown another pair of supply electrodes 8 and 9 and a diametrically opposite shorting electrode 10, such further group being displaced 90° relative to the first electrode set. These further electrodes are shown spaced from the pipe ends, the supply electrodes 8 and 9 as connected to the same source as the first-mentioned supply electrodes 5 and 6, and the two sets will be adjusted alternately to engage the pipe ends. In the second such arrangement, with electrodes 5, 6 and 7 retracted and electrodes 8, 9 and 10 moved into engagement with the pipe ends, the current flow in the latter will be the same as described above, but the work circuits will now be spacially shifted to provide the overlap of concentrated current flow which evens the heating about the entire circumference of each pipe end.

My new method, then, comprises the steps of bringing pipe ends and the like into close-spaced opposition, applying alternating electric energy, preferably of high frequency, across such ends at a first peripheral location and completing a circuit for current flow in the ends by bridging the same at a substantially diametrically opposite location, the instantaneous currents in the pipe ends thus flowing in opposite directions and becoming concentrated toward the end faces by proximity effect, and shifting the points of energy supply and bridging circumferentially on the pipe ends, so that the latter are completely traversed by the concentrated current flow. After heating in this manner to the welding temperature, the pipe ends are forced together to complete a pressure weld.

Figure 2:
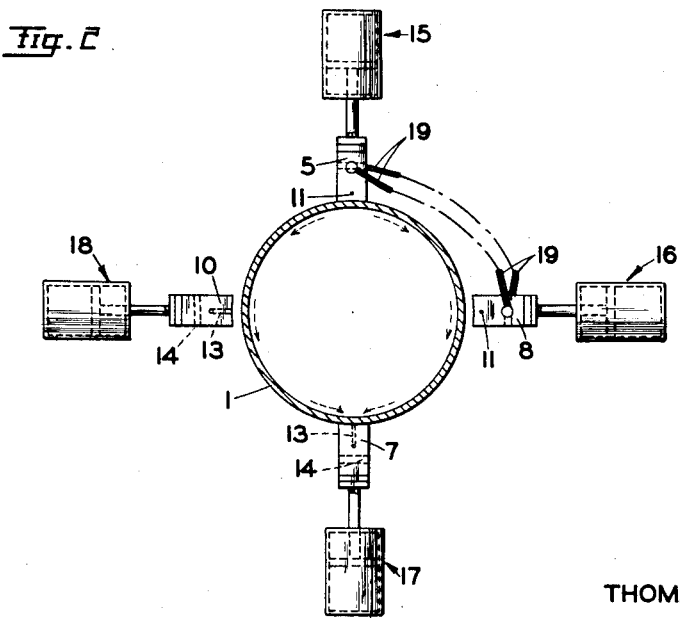
Fig. 2 is a vertical cross-section taken approximately on the line 2—2 in Fig. 1.

It will be apparent that the regions of the pipe beneath the electrodes of the set not in use at a given stage of the operation are being heated and that when such electrodes are moved from stand-by to operative position, the contact areas in this case are thus at an elevated temperature. To ensure that good electrical contact is made under such conditions, it is preferred to blanket the regions where such subsequent contact will be made with an inert gas, such as argon or helium, thereby to prevent oxidation and scaling in these contact areas. This may conveniently be accomplished by supplying the gas through the electrodes, and for this purpose the supply electrodes in Fig. 1 are shown as having individual gas supply tubes 11 entering the sides of the same and opening at their pipe-contacting faces. A further gas supply line 12 extends into each shorting electrode and branches therein to two outlets 13 at the respective contact faces of the same. With the two electrodes sets of the Figs. 1 and 2 assembly in the operative positioning shown, the argon, helium, or other inert gas is being discharged through the supply electrodes 8 and 9 and the shorting electrode 10 against the pipe end areas to be contacted respectively thereby when subsequently used for the current supply.

The electrodes are water cooled in suitable manner, the internal conduits being indicated by the dashed circles 14 therein, and this first apparatus also includes piston-cylinder assemblies 15–18, which may be either pneumatic or hydraulic, for actuation of the several electrodes. The electrodes are connected to the pistons of such assemblies and the latter controlled to retract and advance the same radially to carry out automatically the above-described sequential heating operation. As illustrated, the supply electrodes of each pair are physically joined for common actuation, with flexible leads 19 providing electrical connection thereto. More than two electrode sets can of course be employed, and the electric source is desirably so regulated as to correct for changes in the work load as the steel is heated through the Curie point, with consequent impedance change. Any suitable high frequency generator can obviously be employed, with the frequency being within the range of from about 1000 cycles per second to about one million cycles per second.

Figure 3:
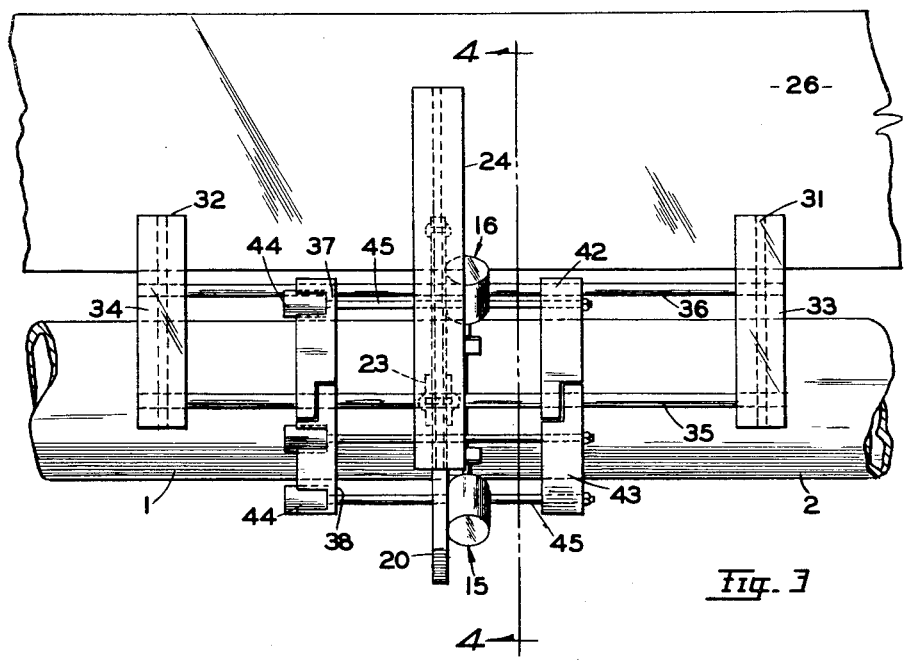
Fig. 3 is a top plan view of automatic pipe end welding apparatus in accordance with the invention.
Figure 4:
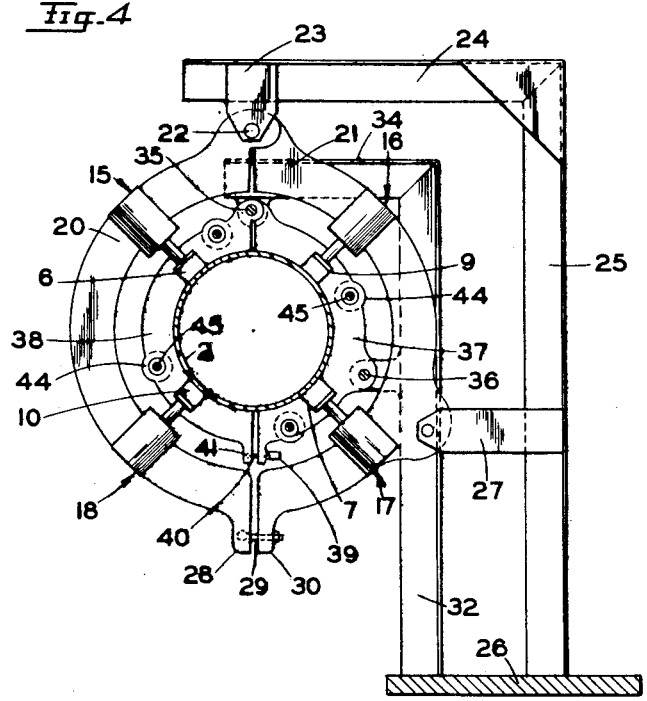
Fig. 4 is a transverse cross-section taken approximately on the line 4—4 in Fig. 3.

The apparatus more fully shown in Figs. 3–5 comprises a pair of semi-circular support arms 20 and 21 adapted to be closed about the pipe end joint to be welded and, in this condition, to form an encircling band of significantly greater diameter than the pipe. Arms 20 and 21 are mounted at their upper ends on a pivot pin 22 carried by a bracket 23 secured to a substantially horizontal support 24 which extends over the pipe. The support 24 is an upper extension of a post 25 secured to a base 26, and the arm 21 is further connected at a point below the axis of the assembly to a bracket or mounting plate 27 fixed on the post 25. It will thus be seen that arm 20 can be swung outwardly and upwardly to an open position which will permit the support structure and the pipe to be relatively moved laterally for disassociation. The free end of the arm 20 has an outwardly projecting ear 28 in which a swivel bolt 29 is carried, and the arm 21 has at its free end an opposed ear 30 which is slotted to receive the nut end of the bolt, whereby the latter can be operated to clamp the arm 20 releasably in its closed condition.

The several cylinders of the electrode assemblies are secured in their proper spaced relation to the arms 20 and 21, the cylinders 15 and 18 thus being secured to the arm 20 and the cylinders 16 and 17 to the arm 21. The mounting of these devices is radial with respect to the pipe axis, so that the several electrodes upon actuation as aforesaid advance on and are retracted from the pipe in radial directions, and it will be understood that the clearance provided by swinging the support arm 20 upwardly will be at least adequate to preclude interference by the inwardly projecting electrodes with the lateral relative movement of the pipe and the support structure.

This apparatus also includes means for forcing the pipe ends together, for completion of the pressure weld after heating, and such means comprises two standards 32 secured to the base 26 respectively at points spaced a predetermined distance to each side of the post 25 and hence the electrode mounting. Standard 31 has an arm 33 extending over the pipe and a similar arm 34 extends from the standard 32. A first rod 35 extends longitudinally between the arms 33 and 34 and a second rod 36 extends from one standard to the other parallel to the rod 35 and at a lower point below the pipe center.

The mounting of these rods is such that the same pass through the annular space between the closed electrode support arms 20, 21 and the pipe.

Supported on the rods 35 and 36 at one side of the electrode assembly, the left in Fig. 3, there is a first pair of pipe clamps comprising semi-circular members 37 and 38. The member 37 is traversed by both rods, while the member 38 is supported only by the upper rod 35 and is swingable thereon. The lower end of the clamp 37 carries a cylinder 39, with swivel mounting thereof, having a piston and rod 40, the latter being receivable in a slot formed in an ear 41 at the lower free end of the clamp 38. A second pair of pipe clamps 42 and 43 is mounted on the through rods 35 and 36, the clamp 42 being supported similarly as the clamp 37 and clamp 43 being pivotal on the rod 35 in the manner of the clamp 38. A further clamping cylinder, not shown, as above described is associated in like manner with the clamps 42 and 43, and it will be noted that the latter are positioned at the other side of the electrode assembly.

The first clamps 37 and 38 mount a series of four cylinders 44 in circularly spaced relation, with two on each such clamp and all arranged with their axes parallel to the pipe axis. Such cylinders are spaced to be located circumferentially at points which fall between the electrodes, and piston rods 45 extend therefrom through the electrode assembly to the second pair of pipe clamps 42, 43 to which they are fixed. The cylinders 44 therefore function as upset cylinders, with the clamps 37, 38 and 42, 43 being operated through their clamping cylinders to grip the pipe lengths respectively and, after proper welding temperature of the pipe end faces is reached, the cylinders 44 actuated to retract the rods 45, drawing the pairs of clamps and hence the pipe lengths together for pressure welding of the latter.

An illustrative hydraulic system for actuating the various cylinders has been shown schematically in Fig. 5 as comprising a tank 46 and a supply line 47 therefrom, the latter including a pump 48 and a pressure relief valve 49 having a return line 50 to the tank. A branch line 51 connects the supply through a solenoid controlled, three-way, two-position valve 52 to the electrode cylinders 15 and 17, while a similar branch 53 having the same type of valve 54 therein supplies the electrode cylinders 16 and 18. The valves 52 and 54 have outlets connected to a return line 55 to the tank and the several electrode cylinders are indicated to be of the type having piston return springs. It may be noted here that such details are not critical, with the piston-cylinder assemblies, valves and the like being of suitable conventional form. What is significant is the mode of operation of the system, whereby opposed electrodes will be simultaneously advanced and retracted by their actuators and the two sets are separately controllable for the sequential operation thereof already discussed.

A single clamping cylinder 39 has been shown as having lines 56 and 57 respectively connecting its ends to a solenoid operated, four-way spool valve 58, likewise conventional and having a branch 59 connected to the supply and return 60 to the tank. The other clamping cylinder, not shown, will be similarly controlled. Also for convenience, only a single upset cylinder 44 is illustrated, the same being of spring-return type connected to the supply by branch line 61 through a valve 62 on the same order as the valves 52 and 54 and also having a connection to the return line 55. The coils of the several solenoid valves are energized by operation of a suitable timer or sequence controller 63.

The electric circuit for supply of the alternating current energy to the electrodes is also shown in Fig. 5, with diagrammatic electrodes shown separated from their actuating cylinders for convenience and clear understanding. This circuit comprises an appropriate high frequency generator 64, and a contactor 65 in the generator output circuit, such contactor being electro-magnetic and controlled by the timer 63. A first tuning capacitor 66 is connected across the output leads and a second tuning capacitor 67 is similarly connected but in series with a relay 68 controlled by the timer.

Beyond the second such tuning capacitor, the primary winding 69 is connected in the generator output circuit, with one end 70 connected directly to one side of the latter and the other end connected through a relay 72 to the other side of such source. The primary winding 69 has a tap 73 connected through a further relay 74 in parallel with the relay 72, both of these relays also being controlled by the sequence controller or timer 63. The transformer has a secondary coil 75 with one side thereof connected commonly to the supply electrodes 5 and 8 and the other side to the remaining supply electrodes 6 and 9.

The two tuning capacitors 66 and 67 and the tap changing of the primary winding thus provided compensate, in heating steel, for changes in the load impedance upon heating through the Curie point, it being apparent that the capacitor 67 can be added to or taken out of the circuit and also that the primary of the transformer may be energized either fully or only over a predetermined number of turns, determined by the position of tap 73. As is well-known, up to near the critical range the permeability of steel is retained, but as the temperature approaches the critical range the steel becomes, rather abruptly, nonmagnetic. The result is a corresponding decrease in the circuit resistance, which is here compensated to maintain impedance matching with the generator.

This complete apparatus will accordingly be seen to provide convenient means for bringing the electrodes and clamps into working engagement with the pipe, both the electrode holders and the pipe clamps being openable. When once brought into operative relation, with the sequence of operations scheduled by appropriate setting of the timer, the latter takes over for fully automatic operation. The pipe clamps are moved or actuated automatically to gripping condition, a pair of supply electrodes and the shorting electrode opposed thereto are advanced into contact with the pipe ends, and the power circuit rendered operative to supply the high frequency alternating current energy. After an interval of heating, such supply is momentarily interrupted, the first group of electrodes retracted, the second group moved into engagement with the pipe ends, and the energy supply re-established, whereupon the high frequency energy is now supplied by such second electrode group.

After one or more such stages in the heating cycle, the pipe ends are brought to welding temperature, and the electrode energization is interrupted and all electrodes withdrawn. The upset cylinders are then actuated to bring the heated pipe ends together for the desired pressure weld. After such completion of the welded joint, the entire electrode and clamp assembly can be withdrawn from the pipe and moved relatively thereto for welding a succeeding joint. It will be appreciated that this structure can easily be made portable by mounting the same on a suitable carriage which could, for example, for field welding, carry a self-contained power unit for the electric energy generation as well as the hydraulic system and other controls. It has already been pointed out that the number of electrode groups can be increased, and similarly the pipe clamping assemblies can be multiplied if desired.

Other modes of applying the principle of the invention may be employed, change being made as regards the details described, provided the features stated in any of the following claims or the equivalent of such be employed.

I, therefore, particularly point out and distinctly claim as my invention:

1. The method of heating pipe ends and the like, which comprises the steps of bringing such ends into close-spaced opposition, applying alternating electric energy across the spaced ends of the two pipes at one peripheral location, completing a circuit for current flow in the ends by conductively bridging the same at another substantially diametrically opposite location, the instantaneous current in any portion of one pipe end flowing oppositely to the direction of current flow in the closely spaced corresponding portion of the other end, whereby such work currents are concentrated toward the pipe end faces by proximity effect, and shifting the points of energy supply to and bridging of the pipe ends circumferentially relative thereto so that the end faces are fully traversed by such concentrated current flow.

2. The method of heating pipe ends and the like, which comprises the steps of bringing such ends into close-spaced opposition, supplying alternating electric energy to the pipe ends through electrodes in contact respectively with corresponding peripheral regions of the two, completing a circuit for current flow in the ends by applying a conductive bridge thereacross substantially in diametric opposition to such electrodes, thereby to produce oppositely flowing currents respectively in ends of the pipe which are concentrated by proximity effect at the end faces, and relatively circumferentially shifting the locations of the electrodes and conductive bridge, while maintaining the same substantially diametrically opposite, so that the previous regions of contact thereof are traversed by such concentrated current flow.

3. The method of heating pipe ends and the like, which comprises the steps of bringing such ends into close-spaced opposition, flowing current in the spaced ends of the two pipes in a first work circuit established by conductively bridging the two at one peripheral region and applying alternating electric energy through electrode means at a substantially diametrically opposite region, the currents in the respective ends flowing in opposite directions and thus being concentrated by proximity effect at the end faces, and interrupting the flow in said first work circuit and then flowing current in a second such circuit established by further electrode and bridging means circumferentially displaced with respect to those of the first circuit, so that the pipe ends are fully traversed by such concentrated current flow in the heating thereof to the desired temperature.

4. The method of welding pipe ends and the like, which comprises the steps of arranging the two pipe ends in alignment with a small air gap therebetween, alternately flowing current in such ends in a plurality of work circuits each having diametrically opposite points of alternating electric energy application across the ends and short-circuiting thereof, the current in the two pipe ends flowing in opposite directions in each work circuit and thus concentrating at the end faces due to proximity effect, the plural circuits being circumferentially spaced about the ends to overlap in the same, so that the end faces are fully traversed by such concentrated current flow, and forcing the pipe ends together when the end faces have been heated, uniformly by the alternate energization of the plural work circuits, to the temperature of welding of the same.

5. Apparatus for electrically heating the ends of pipe and the like, comprising a plurality of circularly spaced electrode groups each including a pair of supply electrodes and a substantially diametrically opposite shorting electrode, the supply electrodes of each group being adapted to engage respectively the ends of the pipes when the same are in close-spaced alignment and the shorting electrode of the group being adapted to bridge the two, means for moving the plural electrode groups independently into and out of such work-engaging position, and control means for energizing each group with alternating electric energy when in such position to cause current to flow in the pipe ends, whereby the ends can be heated by current flow in plural overlapping and successively energized work circuits in the same.

6. Apparatus for electrically heating the ends of pipe and the like, comprising a first pair of supply electrodes adapted to contact corresponding peripheral regions of the two pipe ends when the same are arranged in alignment with a small air gap therebetween, a second similar pair of supply electrodes angularly displaced from the first and adapted to contact the pipe ends, at a different peripheral location, in like manner, a shorting electrode associated and forming an operative electrode set with each pair of supply electrodes, the shorting electrodes being adapted to interconnect the spaced ends of the pipe approximately 180° from their respectively associated supply electrodes, means for relatively moving the supply and shorting electrodes of each set in and out to engage and disengage the pipe ends, means for controlling such movement so that the two electrode sets are alternately engaged with such ends, and means for energizing the pair of supply electrodes in each set with alternating energy when such set is thus moved into engagement with the work, thereby to produce heating current flow in the pipe ends in two overlapping and alternately energized circuits in the same.

7. Apparatus for welding pipe ends and the like, comprising a plurality of circularly spaced electrode groups each including a pair of supply electrodes and a substantially diametrically opposite shorting electrode, the supply electrodes of each group being adapted to engage respectively the ends of the pipes when the same are in close-spaced alignment and the shorting electrode of the group being adapted to bridge the two, means for moving the plural electrode groups independently into and out of such work-engaging position, control means for energizing each group with alternating electric energy when in such position to cause current to flow in the pipe ends, whereby the ends can be heated by current flow in plural overlapping and successively energized work circuits in the same, and means for applying pressure to force the pipe ends together after the same are thus heated to welding temperature to form a pressure weld.

8. Apparatus for welding pipe ends and the like, comprising a first electrode group including a pair of supply electrodes and a shorting electrode in substantially diametric opposition, a second electrode group similar to the first and angularly displaced relative thereto about a common work axis, means mounting the several electrodes for substantially radial movement between advanced work-engaging positions and retracted stand-by positions, sequence control means operative to move the electrodes of the first group to such work-engaging condition with the electrodes of the second group retracted and thereafter to retract the former to stand-by and advance the latter to their work-engaging positions, each pair of supply electrodes being adapted respectively to contact the ends of the pipe to be welded when the same are in slightly spaced-apart relation and each shorting electrode to bridge such pipe ends, means for supplying high-frequency alternating electric energy to the supply electrodes in work-engaging position, and means for discharging inert gas against the pipe ends at the regions thereof adjacent the contact faces of the electrodes in stand-by condition.

9. Apparatus as set forth in claim 8 wherein said last-named means includes gas passages within the electrodes and opening at the work-contacting faces of the same.

10. Apparatus as set forth in claim 8 characterized further by the provision of means for forcing the pipe ends together after heating thereof to welding temperature.

References Cited in the file of this patent

UNITED STATES PATENTS 2,066,668    Bennett                Jan. 5, 1937